(12) United States Patent
Albrecht et al.

(10) Patent No.: US 10,906,115 B2
(45) Date of Patent: Feb. 2, 2021

(54) AUTOMATIC PROCESS AND/OR SET UP OF WELDING TYPE SYSTEM

(71) Applicant: Illinois Tool Works Inc., Glenview, IL (US)

(72) Inventors: Bruce P. Albrecht, Appleton, WI (US); Robert R. Davidson, New London, WI (US)

(73) Assignee: Illinois Tool Works Inc., Glenview, IL (US)

( * ) Notice: Subject to any disclaimer, the term of this patent is extended or adjusted under 35 U.S.C. 154(b) by 345 days.

(21) Appl. No.: 15/814,650

(22) Filed: Nov. 16, 2017

(65) Prior Publication Data
US 2019/0143436 A1    May 16, 2019

(51) Int. Cl.
| | |
|---|---|
| *B23K 9/095* | (2006.01) |
| *B23K 9/10* | (2006.01) |
| *B23K 9/16* | (2006.01) |
| *B23K 9/23* | (2006.01) |
| *B23K 9/20* | (2006.01) |
| *B23K 9/09* | (2006.01) |
| *B23K 9/12* | (2006.01) |

(52) U.S. Cl.
CPC ............ *B23K 9/0953* (2013.01); *B23K 9/09* (2013.01); *B23K 9/0956* (2013.01); *B23K 9/1006* (2013.01); *B23K 9/1012* (2013.01); *B23K 9/1062* (2013.01); *B23K 9/1087* (2013.01); *B23K 9/12* (2013.01); *B23K 9/16* (2013.01); *B23K 9/20* (2013.01); *B23K 9/23* (2013.01)

(58) Field of Classification Search
CPC ....... B23K 9/0953; B23K 9/09; B23K 9/0956; B23K 9/1006; B23K 9/1012; B23K 9/1062; B23K 9/1087; B23K 9/12; B23K 9/16; B23K 9/20; B23K 9/23
See application file for complete search history.

(56) References Cited

U.S. PATENT DOCUMENTS

| | | | |
|---|---|---|---|
| 6,087,626 | A | 7/2000 | Hutchison et al. |
| 6,091,048 | A | 7/2000 | Lanouette et al. |
| 6,909,067 | B2 | 6/2005 | Davidson et al. |

(Continued)

FOREIGN PATENT DOCUMENTS

| | | |
|---|---|---|
| CN | 104951691 | 9/2015 |
| CN | 105706007 | 6/2016 |

(Continued)

OTHER PUBLICATIONS

Int'l Search Report and Written Opinion Appln No. PCT/US2018/061440 dated May 22, 2019.

(Continued)

*Primary Examiner* — Jeremy Carroll
(74) *Attorney, Agent, or Firm* — McAndrews, Held & Malloy, Ltd.

(57) ABSTRACT

A method and apparatus for providing a welding type power using a welding power circuit having a control input and a welding type power output, a feedback circuit and a controller connected to the control input and the feedback circuit is disclosed. The controller includes a parameter setting module and/or a process selection module that are connected to and responsive to at least one of the feedback circuit. The a process selection module can be responsive to the parameter setting module.

15 Claims, 7 Drawing Sheets

(56) References Cited

U.S. PATENT DOCUMENTS

| | | | |
|---|---|---|---|
| 9,442,481 B2 | 9/2016 | Davidson et al. | |
| 2012/0006136 A1 | 3/2012 | Davidson et al. | |
| 2012/0241429 A1* | 9/2012 | Knoener | B23K 9/32 |
| | | | 219/130.01 |
| 2012/0298643 A1* | 11/2012 | Lambert | B23K 9/0956 |
| | | | 219/130.21 |
| 2016/0101481 A1* | 4/2016 | Holverson | B23K 9/16 |
| | | | 219/602 |
| 2017/0005025 A1 | 2/2017 | Davidson et al. | |
| 2018/0093342 A1 | 4/2018 | Davidson et al. | |

FOREIGN PATENT DOCUMENTS

| | | | |
|---|---|---|---|
| EP | 1475180 | 11/2004 | |
| EP | 1475180 A1 * | 11/2004 | B23K 9/0282 |

OTHER PUBLICATIONS

Canadian Office Action for Application No. 2,924,120 dated Mar. 4, 2020 (4 pages).

* cited by examiner

AUTOMATIC PROCESS AND/OR SET UP OF WELDING TYPE SYSTEM

FIELD OF THE INVENTION

The present disclosure relates generally to the art of welding type systems. More specifically, it relates to automatically setting the process and/or output parameters of a welding type system.

BACKGROUND OF THE INVENTION

Some welding type systems can be used for a variety of welding type processes. Examples of such processes include MIG, RMD™, pulse, short circuit, pulse spray, Accu-Pulse™, Versa-Pulse™, additive manufacturing, etc. Some processes are cooler (such as RMD™ and additive manufacturing), and some process are hotter, such as MIG. Once a process is selected, increasing the output current generally increases the heat, and decreasing the output current generally decreases the heat. Welding type systems can be used as part of a robotic system, or have hand held guns/torches that are used by a person. Welding type system, as used herein, refers to a system that can provide welding type power, and includes the power circuitry, control circuitry and devices, and ancillary equipment, and can be located in one location such as a weld cell, and can be distributed across multiple locations, including remote locations.

Prior art welding type systems typically include a welding-type power supply that provides welding type power. The welding type power is derived using a welding type power circuit controlled by a controller. Welding type power supply, as used herein, refers to a power supply that can provide welding type power. Welding type power, as used herein, refers to power suitable for welding, plasma cutting, induction heating, CAC-A, and/or hot wire welding/preheating (including laser welding and laser cladding). Welding type power circuit, as used herein, refers to power circuitry that receives an input power and provides welding-type power. Controller, as used herein, includes digital and analog circuitry, discrete or integrated circuitry, microprocessors, DSPs, FPGAs, etc., and software, hardware and firmware, located on one or more boards, used to control all or part of a welding-type system or a device such as a power supply, power source, engine or generator.

When a prior art multi-process welding type system is used the user must select the process that will be used for the particular weld being performed. After selecting the process, the user selects output parameters for the particular weld being performed. Both of these selections—the process to be used, and the parameters for the process—can be difficult for typical users to make. Selecting which process to use, and choosing output parameters for the process selected requires experience and knowledge that many users simply do not have. The process and parameter selection can depend on the type of material being welded, the thickness of the material being welded, the qualities the weld will need (strength, precision, etc), the speed at which the weld must be completed, the appearance of the weld, the equipment being used, the skill of the user, etc. Moreover, once a process is selected these factors, along with process and equipment limitations are considered. Thus, it is difficult for many users to select an appropriate process and output parameters.

Sometimes the process selection and output parameters are selected by a welding engineer, and implemented by the user. However, variations in set-up, skill, parts, etc. can means the appropriate process and parameters are not the same for each weld. Also, the appropriate process at the start of a weld could be different than the appropriate process after the weld had been started. Moreover, the user typically implements selections made in advance by a weld engineer, and will not change the process and/or parameters. Thus, the user does not typically select a better process based on observing the weld.

Accordingly, a welding type system that automatically selects an appropriate process and/or automatically selects appropriate output parameters is desired. Preferably this determination is made based on feedback from welding, or based on inputs from users.

SUMMARY OF THE PRESENT INVENTION

According to a first aspect of the disclosure a welding type system includes a welding power circuit having a control input and a welding type power output, a feedback circuit and a controller. The controller is connected to the control input and the feedback circuit. The controller has a parameter setting module and a process selection module. The process selection module is connected to and responsive to the feedback circuit and/or the parameter setting module.

According to a second aspect of the disclosure a welding type power supply includes a welding power circuit having a control input and a welding type power output, a feedback circuit, and a controller. The controller is connected to the control input and the feedback circuit, and the controller includes a parameter setting module and a process recommendation module. The process recommendation modules is connected to and responsive to at least one of the feedback circuit and the parameter setting module.

According to a third aspect of the disclosure a method of supplying welding type power includes converting input power to welding type power suitable for a selected at least one process of a plurality of processes, providing a feedback signal indicative of the welding type power, setting at least one parameter of the welding type power, controlling the converting in response to the feedback signal and the at least one parameter, and choosing the selected at least one process from the plurality of processes in response setting the at least one parameter and/or the feedback signal.

According to a fourth aspect of the disclosure a welding type system comprises a welding power circuit having a control input and a welding type power output, a feedback circuit, and a controller connected to the control input and the feedback circuit. The controller includes a parameter setting module that is connected to and responsive to the feedback circuit.

A heat sensing module and/or a weld history module are included and one or both have an input connected to the feedback circuit and an output connected to the process selection module in one alternative.

The feedback circuit includes a weld image sensor, which can include a smart phone or other device in various embodiments.

At least one user input is provided to the parameter setting module in another alternative.

The at least one user input includes one or more of a user set wire feed speed, a user set output voltage, a user set current, a user set power, a user set heat, a user set travel rate, a user set deposition rate, a user set material type, a user set joint type, a joint type cad file, a user set wire type, a user set wire size, a user set manual/automation selection, a user set gas type, a user set weld duration and a user set travel length in various embodiments.

At least one robot set input is provided to the parameter setting module in one embodiment.

The feedback circuit provides a signal responsive to one or more of the welding type power output, welding type current output, welding type voltage output, a welding advisor, and an external sensor that senses sound, light or spatter, and the feedback signal is provided to the process selection module, and the process selection module is responsive to the feedback circuit in various alternatives.

The controller includes a window module responsive to one or more of the feedback circuit and the parameter setting module, and the window module responsive to the at least one user input, such that the window module provides an operating window as a window input to the process selection module in one embodiment.

The process selection module includes a MIG module, or at least two of a short circuit transfer module, a controlled short circuit module, a MIG module, a pulsed MIG module, a retractable wire feed module, a spray module, a regulated metal deposition module, an additive manufacturing module, an accupulse and a versa pulse module in various embodiments.

The process selection module includes at least one of a process recommendation module and a process purchase recommendation module that are responsive to the feedback circuit and/or the parameter setting module in another alternative.

The controller includes a tuning module active at the start of a weld in one embodiment.

The process selection module is located in a housing that includes the welding power circuit, or in a weld cell that includes the welding power circuit, or outside of the weld cell that includes the welding power circuit, or outside of a facility in which the welding power circuit is located in various embodiments.

The feedback signal comprises at least one of sensing a heat of the weld, an image of the weld, sensing the welding type power, voltage or current output, receiving a signal from a welding advisor, receiving a signal from an external sensor that senses sound, light or spatter, and providing a feedback signal from prior welds in another alternative.

Choosing the selected at least one process includes choosing at least one of short circuit transfer process, a controlled short circuit process, a MIG process, a pulsed MIG process, a retractable wire feed process, a spray process, a regulated metal deposition process, an additive manufacturing module, an accupulse and a versa pulse process in one embodiment.

Commanding a plurality of outputs at the start of a weld is performed such that the plurality of outputs are selected to determine what process is appropriate for a desired weld, and the selected at least one process is chosen in response to the feedback signal from the commanded plurality of outputs in various embodiments.

Recommending the purchase or use or demo of an additional process is performed in response to the feedback signal and/or the parameters that are set in another alternative.

Setting at least one parameter includes receiving at least one of a robot set input and a user input, wherein the user input is indicative of at least one of a user set wire feed speed, a user set output voltage, a user set current, a user set power, a user set heat, a user set travel rate, a user set deposition rate, a user set material type, a user set joint type, a joint type cad file, a user set wire type, a user set wire size, a user set manual/automation selection, a user set gas type, a user set weld duration and a user set travel length in one embodiment.

Choosing the selected at least one process includes providing an output operating window for at least one output parameter in various embodiments.

The parameter setting module includes an activation/deactivation module that is responsive to at least one of a user input, a start detection module, and a stability detection module in another alternative.

Other principal features and advantages of will become apparent to those skilled in the art upon review of the following drawings, the detailed description and the appended claims.

Figure 1:
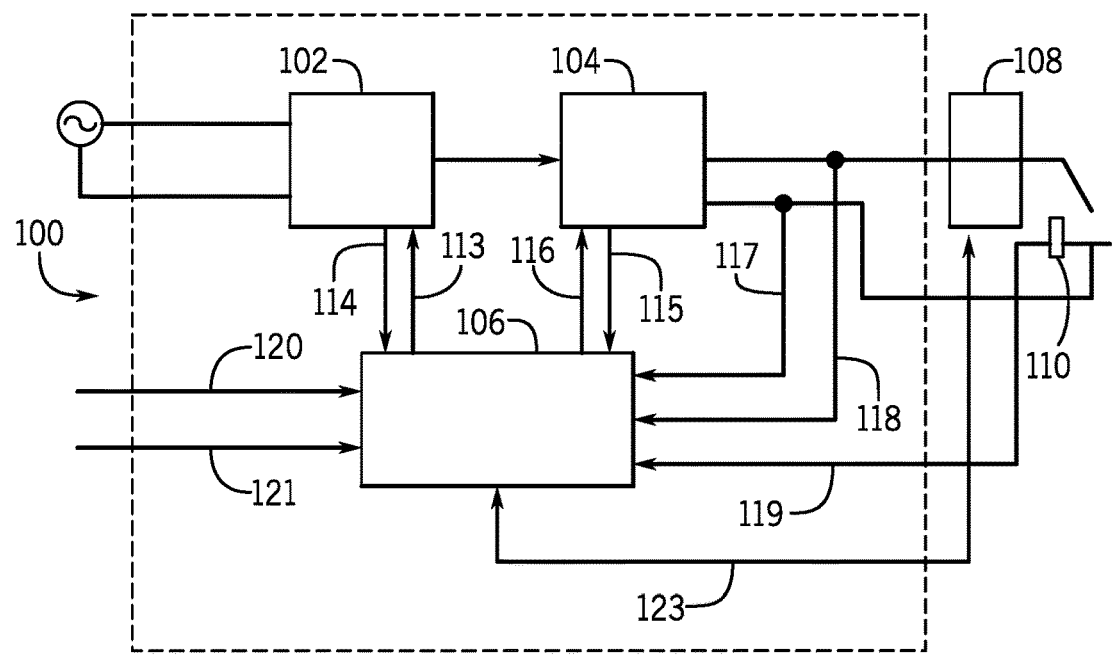
FIG. 1 is a diagram of a welding type system.

Before explaining at least one embodiment in detail it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting. Like reference numerals are used to indicate like components.

DETAILED DESCRIPTION OF THE PREFERRED EMBODIMENTS

While the present disclosure will be illustrated with reference to a particular welding type system used in a particular way, it should be understood at the outset that the ideas discloses may be used with other welding type systems used in other ways.

Generally, a welding type system is disclosed that provides for automatic process selection and/or automatic output parameter selection in response to feedback from the weld, or provides for automatic process selection in response to the setting of the output parameters. The invention is preferably implemented with a multi process welding type system such as a Miller Continuum™ or a Miller AxcessE®.

Figure 2:
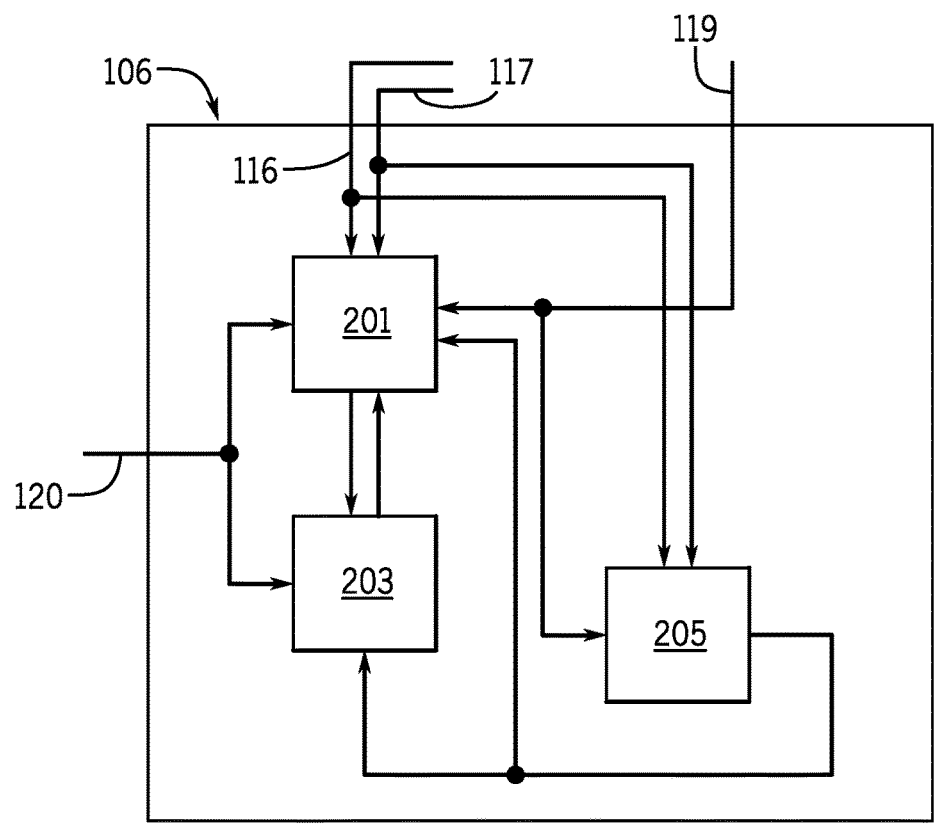
FIG. 2 is a diagram of a controller for a welding type system.

A welding type system 100 is shown in FIG. 2, and includes a welding type power circuit 102, a wire feeder 104, and a controller 106. Welding type power circuit 102 converts input power to welding type power, and can include converters such as those known in the prior art. The welding type power produced is provided to wire feeder 104. Wire feeder 104 is omitted in various embodiments. An optional robotic system 108 cooperates with wire feeder 104 and welding type power circuit 102 to provide wire and power to the weld in response to the robot.

Controller 106 controls power circuit 102 to provide welding type power that is appropriate for a selected welding process. As will be described in more detail below, welding type power circuit 102 can be controlled to provide power appropriate for a plurality of welding processes. Welding process, as used herein, refers to the type of welding being performed, such as RMD™, pulse, short circuit, MIG, TIG, etc. Controller 106 also sets the output parameters of system 100 such as current voltage, slope, inductance, etc., and the speed at which wire feeder 104 feeds wire to the weld.

Controller 106 provides control signals on lines 113 to power circuit 102 and on lines 116 to wire feeder 104 that control power circuit 102 and wire feeder 104 to provide power and wire to the weld for the selected process at the selected output parameters. Controller 106 also receives feedback from power circuit 102 on lines 114, wire feeder 104 on lines 115, and of the output on lines 117 and 118. The feedback can be power, voltage, current, ripple, frequency or functions thereof. A sensor 110 can provide feedback from the weld, such as sound or vision feedback, on line 119. A communication line 123 provides communication to and from the robot 108 may also be included. Controller 106 receives one or more user inputs on line 120 (line 120 can include multiple conductors and carry digital or analog signals) and signal from a remote portion of control 106, such as a cloud-based module, on line 121.

One embodiment provides that the user begins welding and then controller 106 receives feedback of the weld on lines 117 and 118, or from sensor 110, and determines the appropriate process to be used. The controller can cause welding-type power system 100 to provide a series of outputs and monitor the output and/or weld, and then select the process in response to the monitoring. For example controller 106 can cause welding-type power system 100 to provide a short circuit MIG output (this process transitions between short circuits and arcs), or a pulse MIG output (this process transitions between peaks and backgrounds), or between processes such as spray MIG and AccuPulse™, MIG, and/or RMD™. Controller 106 can also select the output parameters based on the feedback.

The controller preferably includes a process selection module that selects the appropriate process. Process selection module, as used herein, refers to a module that recommends, or selects one of a plurality of welding process and provides control signals used for that process, in response to an input (for example a signal responsive to a user selection or feedback) to the process selection module. Control module, as used herein, may be digital or analog, and includes hardware or software, that performs a specified control function. Module, as used herein, includes software and/or hardware that cooperates to perform one or more tasks, and can include digital commands, control circuitry, power circuitry, networking hardware, etc.

FIG. 2 shows one embodiment of controller 106, which includes a process selection module 201 that receives the feedback from lines 116, 117 and 119. As an example, if feedback from the weld indicates the heat input to the weld is too cold or too much spatter, then process selection module 201 would select pulse MIG as the process.

Figure 3:
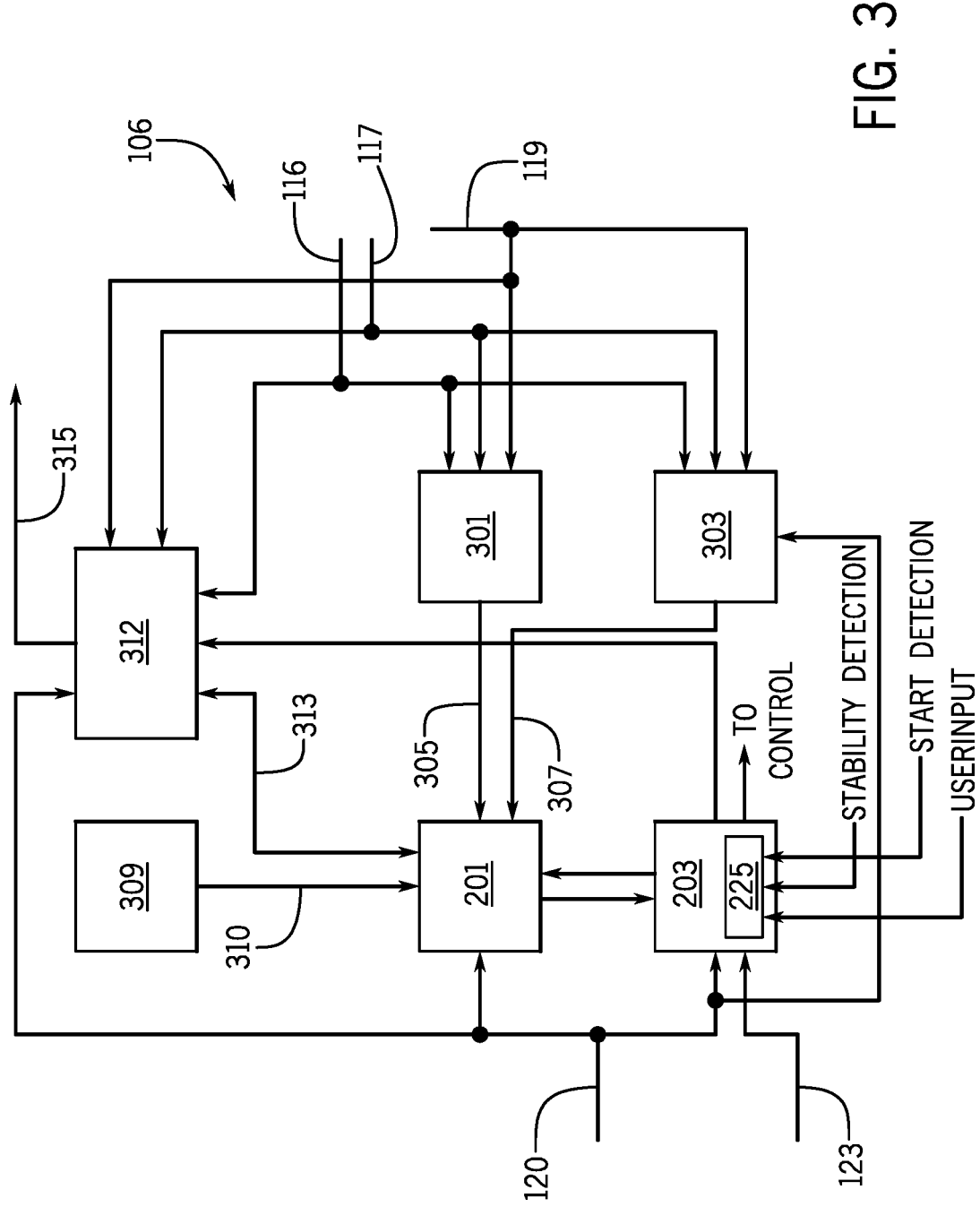
FIG. 3 is a diagram of a controller for a welding type system.

Another embodiment of controller 106 is shown in FIG. 3, and the user provide various inputs, such as output parameters, or material thickness, wire type, and speed on line 120. Controller 106 selects the process based on these user inputs. Controller 106 also includes parameter setting module 203 that receives user inputs on line 120. In this embodiment parameter setting module 203 sets the parameter based on the user inputs. Then, process selection module 201 selects the process based on the set parameters. The parameters can be set directly by the user, or set by module 203 in response to user inputs such as a user set wire feed speed, a user set output voltage, a user set current, a user set power, a user set heat, a user set travel rate, a user set deposition rate, a user set material type, a user set joint type, a joint type cad file, a user set wire type, a user set wire size, a user set manual/automation selection, a user set gas type, a user set weld duration and a user set travel length. An alternative to this embodiment provides that the user inputs are received by parameter setting module 203 from robot 108 on line (or lines) 123. Parameter setting module, as used herein, refers to a module that receives inputs indicative of one or more desired settings for one or more parameters, and provides outputs in response thereto.

For example, the user might specify 16 gauge steel lap joint with gap issues between the two weld plates or spatter issues, 0.035 Steel E70 wire, 90% Argon/10% CO2 gas, 25 ipm travel. In response process selection module 201 might select RMD™ as the process and a wfs of 250 ipm, and 50 arc length. An alternative might be a setup of 16 gauge steel lap joint, 0.035 Steel E70 wire, 90% Argon/10% CO2 gas, 25 ipm travel, but with a desire to travel faster to complete the weld more quickly. In response the process selection might select VersaPulse™ as the process and the parameter selection might be 350 ipm 45 arc length. In one implementation of the patent the system would detect that gaps, spatter, or travel rate is the issue in the current weld based on feedback. For example, a travel speed sensor can detect the travel speed and the parameters or process can be adjusted in response to the sensing. The sensed data (such as travel speed) could also be indicated by a user input. In another implementation the user selects 17 volts at 150 inches per minute using 0.035 inch wire, and in response the process selection module selected a short circuit transfer process.

When process selection module 201 sets the process in response to feedback, a heat sensing module 301 and/or a weld history module 303 may be used. Heat sensing module, as used herein, refers to a module that receives feedback directly or indirectly responsive to a welding power output (or current, voltage, frequency, ripple, or functions thereof) and provides a signal indicative of the heat of the weld. Weld history module, as used herein, refers to a module that receives and stores data from prior welds or prior welding of the current weld, and provides a signal responsive to the data.

Heat sensing module 301 receives feedback indicative of voltage and/or current, and from that feedback can determine the power and the heat input to the weld. A signal responsive to the heat input to the weld is provided on lines 305 to process selection module 201. In response to that input process selection module 201 selects the a cooler or hotter process, depending on the heat input to the weld. Alternatively, heat sensing module 301 can receive feedback on line 119 that senses an image of the weld using weld image sensor 110. The image can be visual, RF, IR, acoustic, or any other type of image. Weld image sensor, as used herein, refers to a sensor receives and processes image data responsive to a weld and can include a camera, an infra red sensor, a visual recognition system, a rf sensor, an acoustic sensor, or other image sensors, and can be a stand-alone sensor, or part of another devoice, such as a tablet, smart phone, etc. In one embodiment sensor 108 is not part of system 100, but is an external device such as a smart phone or tablet that records the image and transmits the image to controller 106.

If process selection module 201 determines that the weld is too hot, based on image sensor 110 or feedback from the output, process selection module 201 selects a cooler process. Alternatively, process selection module 201 can send a signal to parameter setting module 203 to lessen the current and wire feed speed, so that the process selected runs cooler.

Weld history module 303 stores data from prior welds, or data from an earlier time in the current weld. In response to this stored data a signal is sent to process selection module 201 which selects the process in response thereto. For example, feedback is provided on lines 116 and 117 indicative of the current and voltage of the weld. From this weld history module 303 stores the heat input, and determines an average heat input form some specified time earlier in the weld. This average is provided to process selection module 201 which then selects the appropriate process. One embodiment performs this averaging at the start of the weld. For example, if during the first few seconds of the weld the average heat input is too cold and more heat/penetration is required the process selection module 201 selects Spray MIG to be the process.

Another embodiment provides that weld history module 303 receives user inputs on line 120 indicating the type of weld being performed, such as material thickness and type, and wire type. Then, weld history module 303 receives feedback indicating heat input and stores that data with the data relating to the type of weld being performed. Then, in future welds, when the user selects the same type of weld, weld history module 303 provides the heat input data to process selection module 201 which selects the appropriate process.

The alternatives above can be implemented using feedback from sensor 110 instead of or in addition to the feedback on lines 116 and 117. For example, sensor 110 can provide an acoustic image that indicates there is too much spatter. In response process selection module 201 selects a cooler process, or causes parameter setting module 203 to set cooler parameters. Sensor 110 can be part of the welding system or an external sensor, such as a smart phone, camera, etc. External sensor, as used herein, refers to a sensor outside of a welding system that senses information related to the weld.

One alternative provides that controller 106 include a process selection module 201 receive a recommendation from a weld advisor 309 on line 310 (which can be part of a feedback circuit including lines 116-119, 305 and 307, and modules 301, 303 and 309). In response process selection module 201 selects the process based on the welding advisor recommendation. Welding advisor, as used herein, refers to a recommendation from a device outside of a welding system that recommends a welding process.

Another alternative provides that controller 106 include a window module 312 that receives feedback on one or more of lines 116-119 and is responsive to the feedback circuit. The window module also receives one or more user inputs on line 120. In response to the feedback and user input window module 312 provides an operating window on line(s) 313 as a window input to the process selection module. Another alternative provides that window module 312 receives a signal from and is responsive to parameter setting module 102. Window module, as used herein, refers to a module that provides an output operating window for one or more parameters, such that the output parameters remain within the window specified. Operating window, as used herein, refers to a range for one or more parameters, wherein the system or process is controlled such that the parameters remain with the range. Window input, as used herein, refers to an input to a control module that specifies an operating window.

The operating window can be used to insure that once process selection module 201 selects a process the output stays within a window that is suitable for that process. This can prevent a user from running a "colder" process such as CSC with an output that is hotter than desired for the process selected. If window module 312 receives a signal from and is responsive to parameter setting module 102 then window module 312 forces the user to operate within a window that includes the set parameters.

Figure 4:
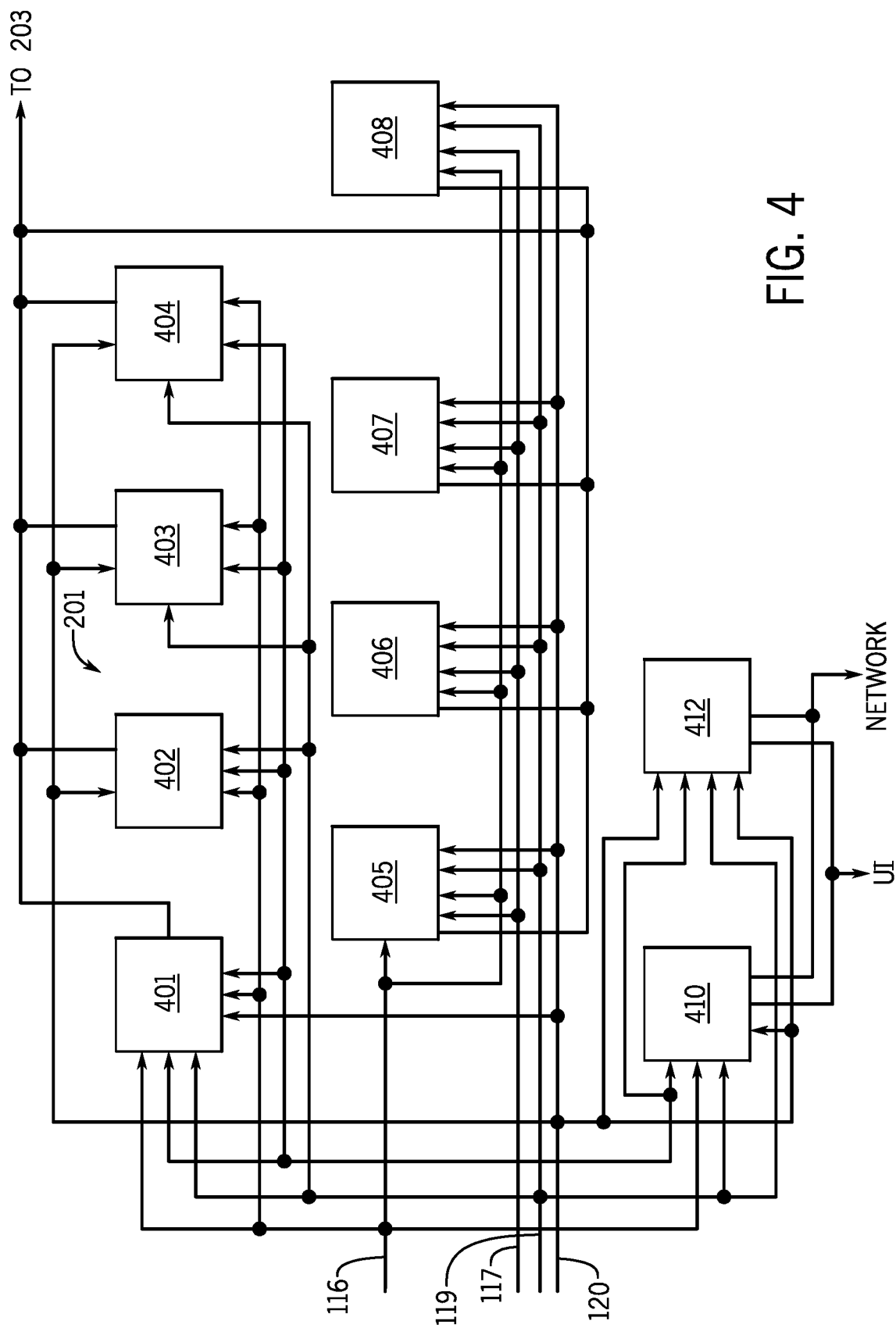
FIG. 4 is a diagram of a process selection module for a welding type system.

Process selection module 201 preferably includes, as shown in FIG. 4, at least two of a short circuit transfer module 401, a controlled short circuit module 402, a MIG module 403, a pulsed MIG module 404, a retractable wire feed module 405, a spray module 406, a regulated metal deposition module 407, and a Versa-Pulse™ module 408. In one embodiment the only available process is MIG, and either only a MIG module is provided, or process selection module 201 is omitted. In some alternatives an additive manufacturing module and/or an Accupulse™ module is either added or replaces another module. For example, one (or two) of modules 401-408 is an addictive manufacturing module and/or Accupulse™ module in one embodiment.

Short circuit module, as used herein, refers to a control module that provides control signals for performing ac or dc short circuit welding. Short circuit welding, as used herein, refers to welding with an output that includes short circuit and arc conditions, and wherein the majority of transfer is during the short circuit condition, for example STT® or RMD™. Controlled short circuit module, as used herein, refers to a control module that provides control signals for performing ac or dc controlled short circuit welding. Controlled short circuit welding, as used herein, refers to welding with an output that includes short circuit and arc conditions, and wherein retracting, stopping or slowing the wire causes the transition from the short circuit condition to the arc condition. MIG module, as used herein, refers to a control module that provides control signals for performing ac or dc MIG welding. Pulsed MIG module, as used herein, refers to a control module that provides control signals for performing ac or dc pulsed MIG welding. Retractable wire feed module, as used herein, refers to a control module that provides control signals for performing welding that includes repeatedly retracting the wire. Spray module, as used herein, refers to a control module that provides control signals for performing ac or dc spray welding. Regulated metal deposition module, as used herein, refers to a control module that provides control signals for performing welding using the RMD™. Additive manufacturing module, as used herein, refers to a control module that provides control signals for performing additive manufacturing for ac or dc welding. Accu-Pulse™ module, as used herein, refers to a control module that provides control signals for performing welding using the Accu-Pulse™ process for ac or dc welding. Versa-Pulse™ module, as used herein, refers to a control module that provides control signals for performing welding using the Versa-Pulse™ process for ac or dc welding.

Process selection module 201 can also include a process recommendation module 410 and/or a process purchase recommendation module 412, which provide recommendations to the user via a user interface and/or to a remote location, such as over the internet or local network. Process recommendation module 410 and/or process purchase recommendation module 412 are/is responsive to feedback and/or parameter setting module 203. Modules 410 and 412 are useful when the weld could be better performed using a process that the system does not provide. A recommendation is provided to the welder (or factory, supervisor, etc.) that the process be purchased (some processes can be added to systems through software upgrades or purchases), or a demo module (i.e., a process that can enable a process to be used for a limited time) be requested. Modules 410 and 412 preferably allow the user to immediately order and download the recommended process. For example, the user might want to perform a particular weld and inputs the thickness and material type. Based on the user inputs process selection module 201 determines that RMD™ would be the best process. If the system does not provide an RMD™ output, process selection modules selects the best process available on that system, but modules 410 and/or 412 recommend that RMD™ be purchased or demo-ed.

Process purchase recommendation module, as used herein, refers to a module that recommends the purchase of a welding process (or obtaining a demo process) in response to an input (for example a signal responsive to a user selection or feedback) to the process purchase recommendation module. Process recommendation module, as used herein, refers to a module that recommends a process or particular welding type system be used in response to an input (for example a signal responsive to a user selection or feedback), and the recommendation can be made during a weld or after a weld has been completed.

One embodiment provides that process recommendation module 410 and/or a process purchase recommendation module 412 are used without process selection module 201. Thus, the system doesn't selects the process, but it recommends that a process be used, the user then decides if they want to use the recommended process. Also, if the process isn't on the system, module 412 can recommend that it be purchased or demo-ed and module 410 can recommend the best process on the system.

Another alternative provides for tuning the process at the start of a weld. This involves commanding a variety of outputs and monitoring the weld to determine what process is appropriate. For example, repeatedly of striking an arc and retracting the wire while adjusting the output can be used to determine the appropriate process. Accordingly, controller 106 can include a tuning module 205 (FIG. 2) that implements the varied commands at the start of the weld. Feedback is used to determine the desired process. Tuning module, as used herein, refers to a module that commands a plurality of output parameters that are selected to determine what process is appropriate for the desired weld, for example, a series of striking an arc, retracting, and repeating can be performed while monitoring feedback. Tuning module 205 is preferably active at the start of the weld, although it could be activated by user request (if the user want to determine the appropriate process) or when it is determined that the incorrect process is being used.

Figure 5:
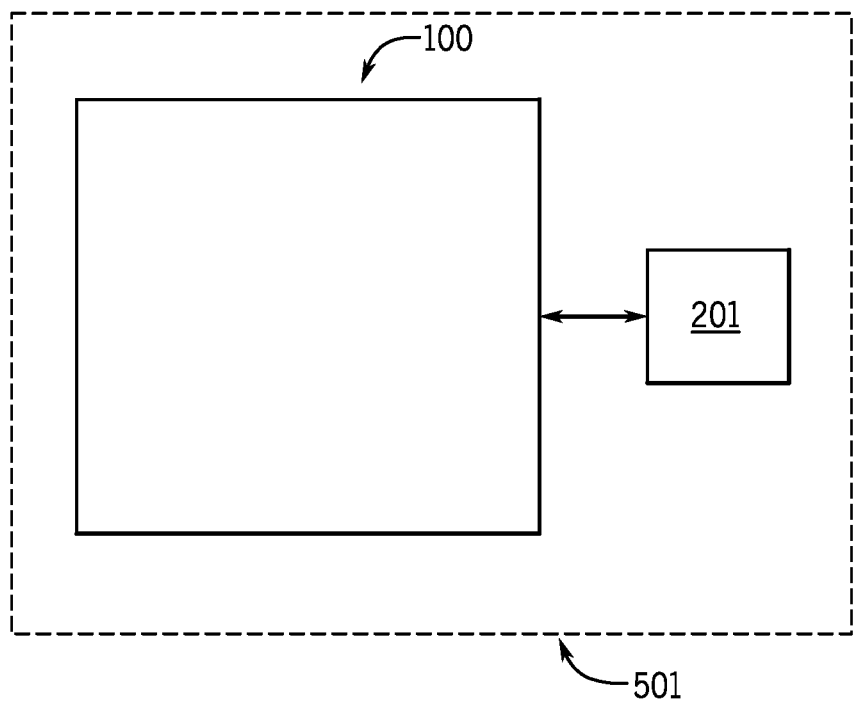
FIG. 5 is a diagram of a controller for a welding type system with an external process selection module.
Figure 6:
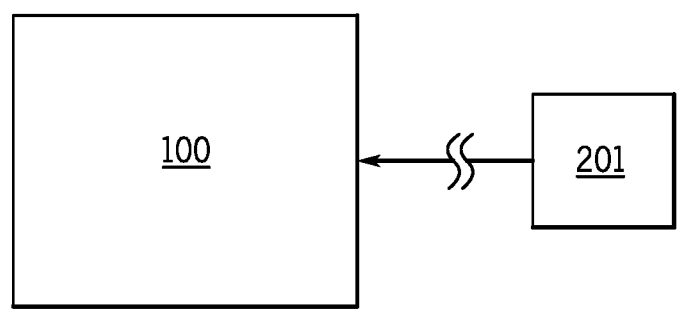
FIG. 6 is a diagram of a controller for a welding type system with a remote process selection module.

Process selection module 201 can be located within a housing, as represented by the dashed line of FIG. 1, that includes welding power circuit. Alternatively, process selection module 201 can be located within a weld cell as indicated by dashed lines of FIG. 5, or outside of the weld cell that includes the welding power circuit, such as inside of or outside of the facility in which the welding power circuit is located, as indicated by the broken lines of FIG. 6.

Figure 7:
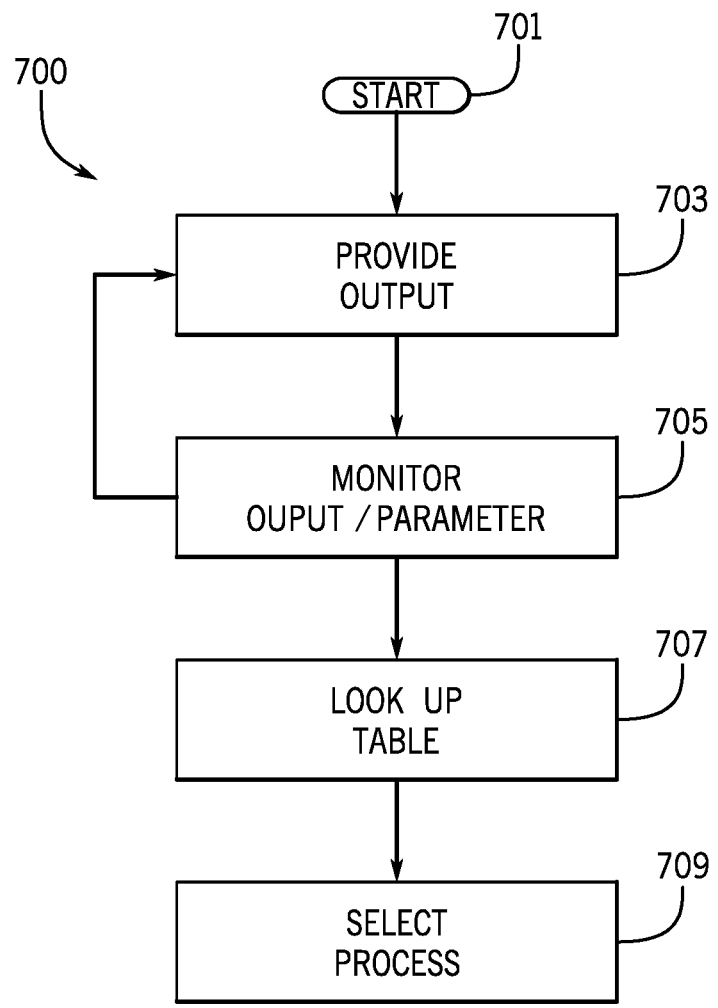
FIG. 7 is a flow chart of process selection module for a welding type system.

The system shown in FIGS. 1-4 can be used to implement a method of selecting a welding process and welding. the method, represented by the flow chart of FIG. 7, includes of supplying welding type power by converting input power to welding type power in step 703. The welding type power is suitable for at least one process selected from of a plurality of processes. Feedback is provided that is indicative of the welding type power (or current, voltage, frequency, ripple or functions thereof). At least one parameter of the welding type power is set. The feedback and set parameter are monitored at step 705. The converting is controlled in response to the feedback and the at least one parameter. Using a look-up table at step 707, the at least one selected one process is chosen from the plurality of processes in response to the parameter and/or the feedback at step 709.

One embodiment provides that parameter setting module 203 us used (either with or without process setting module 201). Parameter setting module is responsive to the feedback circuit. In this embodiment the parameters are adjusted to produce a desired weld for the given process (the process may be selected by module 201 or by the user, robot, etc.). The parameters can be adjusted to reduce spatter, produce a more desirable weld, etc.

Figure 8:
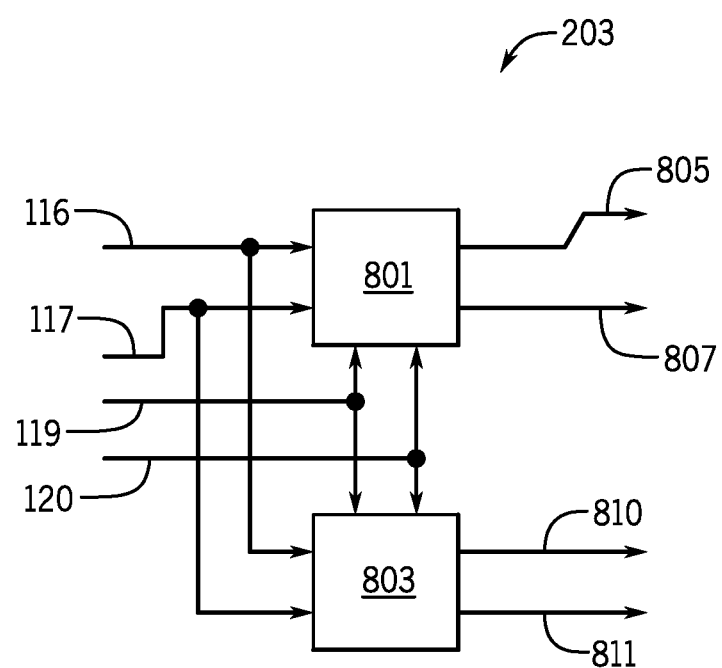
FIG. 8 is a diagram of a parameter setting module for a welding type system.

Parameter setting module 203 in this embodiment preferably includes, as shown in FIG. 8, is at least one of a MIG parameter setting module 801 and a TIG parameter setting module 803 that receive any of the feedback and inputs described above. MIG parameter setting module 801 includes a first MIG output control 805 that sets a slope and a second MIG output control 807 that sets an output inductance. TIG parameter setting module 803 includes a first TIG output control 810 setting a balance, a second TIG output control 811 setting a pulsing frequency. Another alternative includes a short circuit parameter setting modules, or other parameter setting modules.

MIG parameter setting module, as used herein, refers to a module controls a MIG output and sets the slope of the output (thereby targeting the maximum output current target) and the output inductance (thereby setting the rate of change of the output current). Short circuit parameter setting module, as used herein, refers to a module that controls a short circuit output and sets the output current magnitude in response to feedback from a plurality of short circuit conditions in a short circuit process. TIG parameter setting module, as used herein, refers to a module that controls a TIG output and sets the balance of the output and pulsing frequency of the output.

The MIG output is typically controlled using a slope and inductance. The output current increases or decreases at a rate set by the inductance—a lower inductance means the current changes values more quickly. Inductance in this sense is not the inductance of a physical inductor, but a value in a control scheme used to determine how fast the output current command changes. Assuming a zero slope, then the change in current ($\Delta I$)=$V*\Delta t/L$, where $\Delta t$ is the time and L is the inductance. The new current command is equal to the old current command plus $\Delta I$ (NewICMND=ICMND+$\Delta I$.

The voltage term "V" in that equation $\Delta I=V*\Delta t/L$ is changed by the slope used in the control scheme, and can be thought of as a voltage command (VCMND). The voltage command (VCMD) is determined using a nominal voltage command (NVCMND) modified by feedback multiplied by a slope. VCMD=NVCMD−IFB*Slope, where IFB is the feedback signal indicative of current (in amps). The preferred control scheme uses a slope of between 2V/100 A and 5V/100 A and a nominal voltage command of 15V. Combining the two equations, $\Delta I=V*\Delta t/L$=(NVCMD−

IFB*Slope)($\Delta$t/L)=(15−IFB*Slope)*($\Delta$t/L), It can be seen that at a slope of zero, $\Delta$I=15*($\Delta$t/L). A slope of 2V/100 A results in $\Delta$I=(15−2*IFB/100)*($\Delta$t/L), and a slope of 5V/100 A results in $\Delta$I=(15−5*IFB/100)*($\Delta$t/L). Thus, the maximum current at a slope of 2V/100 A is 750 A, because at 750 A and a slope of 2, $\Delta$I=(15−2*750/100)*($\Delta$t/L)=0, and the current will not increase. Similarly, the maximum current at a slope of 3 is 500 A, and the maximum current at a slope of 5=300 A. Thus, in accordance with the preferred control scheme inductance determines how fast the current rises or falls, and slope determines the maximum current, and affects how fast the current changes.

Figure 9:
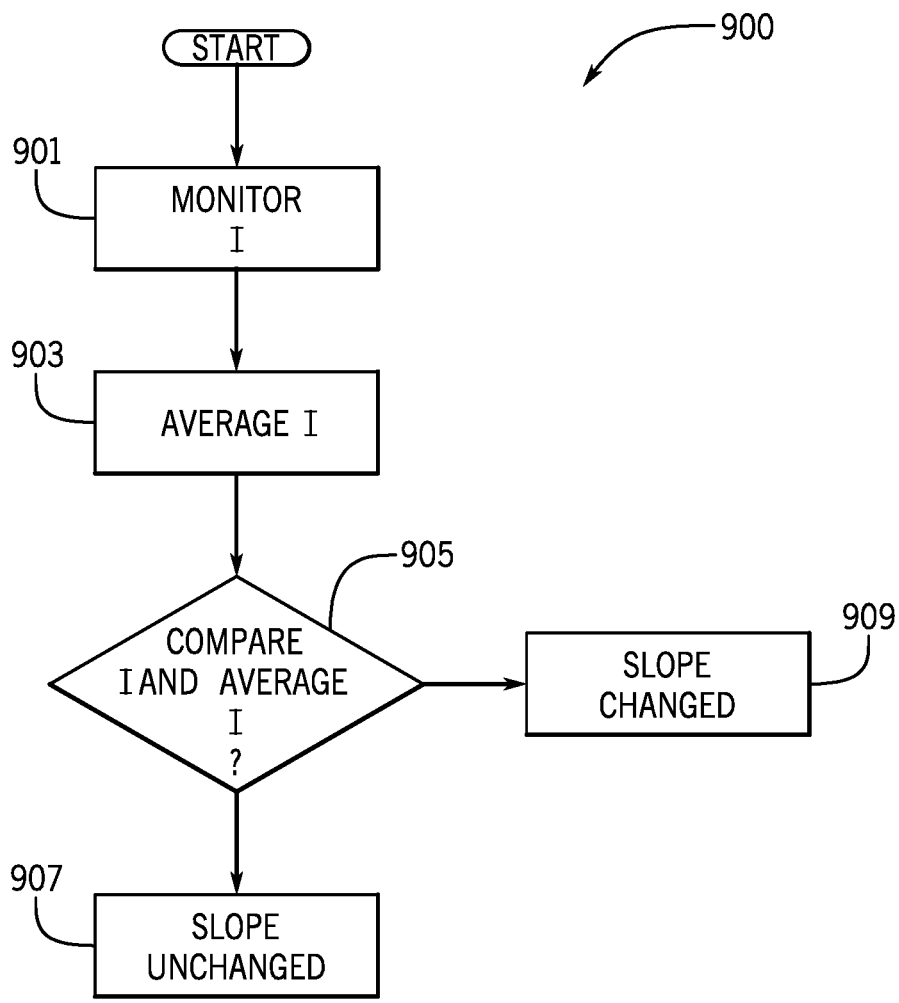
FIG. 9 is a flow chart of parameter setting module for a welding type system.

One embodiment of MIG parameter setting module 901 provides that current is higher than expected the slope is increased thereby lower the maximum current. While MIG parameter setting module 901 can be implemented in any way that provides the desired control signals, the preferred embodiment is implemented using a flow chart 900 (FIG. 9). The current during a short circuit is monitored at step 901. This value is stored and an average current is calculated in step 903. The current is averaged over multiple short circuits. The instantaneous current from the short occurring now is compared to the average current at decision point 905. Decision point 905 can be a comparator (anything that compares two numbers including hardware or software). If the average current and the instantaneous current are within a threshold the slope is not changed at step 907. If they differ by an amount greater than the threshold the slope is adjusted at step 909. The threshold can be different in the positive and negative directions.

Other embodiments provide that parameter setting module 203 includes of an activation/deactivation module 225 (FIG. 3) that is responsive to at least one of user input, a start detection module, and a stability detection module. This allows module 203 to be activated only when requested by the user, only at the start, and/or only when the process is becoming unstable Activation/deactivation module, as used herein, refers to a module that activates and then deactivates another modules in response to an input to the activation/deactivation module, for example, an activation/deactivation module can turn on a parameter setting module in response to a user input, detecting the start of a weld, detecting an instability, etc, and can turn off the parameter setting module in response to an elapsed time, feedback, or detecting a stable process. Start detection module, as used herein, refers to a module that detects the start of a welding process from a user command to start, a system command, a signal within the system, or feedback. Stability detection module, as used herein, refers to a module that detects stability or instability of the process by monitoring an output, such as monitoring spatter, comparing a plurality of cyclical outputs to on another, or comparing one or a plurality of cyclical outputs to a target.

Numerous modifications may be made to the present disclosure which still fall within the intended scope hereof. Thus, it should be apparent that there has been provided a method and apparatus for welding that fully satisfies the objectives and advantages set forth above. Although the disclosure has been described specific embodiments thereof, it is evident that many alternatives, modifications and variations will be apparent to those skilled in the art. Accordingly, the invention is intended to embrace all such alternatives, modifications and variations that fall within the spirit and broad scope of the appended claims.

The embodiments of the invention in which an exclusive property or privilege is claimed are defined as follows:

1. A welding type system, comprising:
   a welding power circuit having a control input and a welding type power output;
   a feedback circuit;
   a controller, connected to the control input and the feedback circuit, wherein the controller includes a parameter setting module, and further includes a process selection module configured to automatically select a welding process from a plurality of welding processes responsive to at least one of the feedback circuit or the parameter setting module; and
   at least one of a heat sensing module and a weld history module, wherein the at least one of a heat sensing module and a weld history module has an input connected to the feedback circuit and has an output connected to the process selection module, and the process selection module is configured to automatically select the welding process responsive.

2. The system of claim 1, wherein the feedback circuit includes a weld image sensor.

3. The system of claim 2, wherein the weld image sensor includes a smart phone.

4. The welding type system of claim 1, further comprising at least one user input connected to the parameter setting module.

5. The welding type system of claim 4, wherein the at least one user input includes a plurality of a user set wire feed speed, a user set output voltage, a user set current, a user set power, a user set heat, a user set travel rate, a user set deposition rate, a user set material type, a user set joint type, a user set wire type, a user set wire size, a user set manual/automation selection, a user set gas type, a user set weld duration and a user set travel length.

6. The welding type system of claim 5, further comprising at least one robot set input connected to the parameter setting module.

7. The welding type system of claim 4, wherein the controller includes a window module responsive to at least one of the feedback circuit and the parameter setting module, and wherein the window module is further responsive to the at least one user input, and wherein the window module provides an operating window as a window input to the process selection module.

8. The welding type system of claim 1, wherein the feedback circuit provides a signal responsive to at least one of the welding type power output, a welding advisor, and an external sensor that senses sound, light or spatter, and wherein the signal is provided to the process selection module, whereby the process selection module is responsive to the feedback circuit.

9. The welding type system of claim 1, wherein the process selection module includes at least two of a short circuit transfer module, a controlled short circuit module, a MIG module, a pulsed MIG module, a retractable wire feed module, a spray module, a regulated metal deposition module, and a versa pulse module.

10. The welding type system of claim 1, wherein the process selection module includes at least one of a process recommendation module and a process purchase recommendation module, and wherein the at least one of a process recommendation module and a process purchase recommendation module is responsive to at least one of the feedback circuit and the parameter setting module.

11. The welding type power supply of claim 1, wherein the controller further includes a tuning module active at the start of a weld.

12. The welding type power supply of claim 1, wherein the process selection module is located in at least one of a housing that includes the welding power circuit, a weld cell that includes the welding power circuit, outside of the weld cell that includes the welding power circuit, and outside of a facility in which the welding power circuit is located.

13. A welding type power supply, comprising:
a welding power circuit having a control input and a welding type power output;
a feedback circuit; and
a controller, connected to the control input and the feedback circuit, wherein the controller includes a parameter setting module, and further includes a process recommendation module configured to automatically recommend, responsive to at least one of the feedback circuit and the parameter setting module, a weld process of a plurality of weld processes.

14. A welding type system, comprising:
a welding power circuit having a control input and a welding type power output;
a feedback circuit; and
a controller, connected to the control input and the feedback circuit, wherein the controller includes a parameter setting module configured to automatically set one or more parameters from a plurality of parameters for a selected welding process responsive to the feedback circuit,
wherein the parameter setting module is at least one of a MIG parameter setting module and a TIG parameter setting module connected to and responsive to the feedback circuit, and wherein the MIG parameter setting module includes a first MIG output control setting a slope and a second MIG output control setting an output inductance and wherein the TIG parameter setting module includes a first TIG output control setting a balance, a second TIG output control setting a pulsing frequency.

15. The welding type system of claim 14, wherein the parameter setting module includes an activation/deactivation module that is responsive to at least one of a user input, a start detection module, and a stability detection module.

* * * * *